United States Patent
Findeisen et al.

[15] 3,686,410
[45] Aug. 22, 1972

[54] SUBSTITUTED HALO PYRAZOLINONES FUNGICIDAL AGENTS

[72] Inventors: Kurt Findeisen; Paul-Ernst Frohberger, both of Leverkusen, Germany

[73] Assignee: Farbenfabriken Bayer Aktiengesellschaft, Leverkusen, Germany

[22] Filed: Nov. 27, 1970

[21] Appl. No.: 93,394

[30] Foreign Application Priority Data

Dec. 6, 1969 Germany..........P 19 61 372.0

[52] U.S. Cl. .................................................424/273
[51] Int. Cl. .................................................A01n 9/22
[58] Field of Search........................................424/273

[56] References Cited

OTHER PUBLICATIONS

Jacs 80 pp. 599– 601 (1958)
Jorg. Chem. 31, 2867– 73 (1966)

*Primary Examiner*—Jerome D. Goldberg
*Assistant Examiner*—Leonard Schenkman
*Attorney*—Burgess, Dinklage & Sprung

[57] ABSTRACT

Fungicidal compositions of and methods of combating fungi using certain halopyrazolinones of the formula

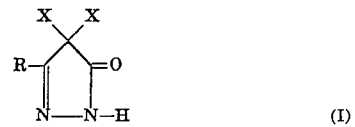

in which each X individually stands for a halogen atom, and R stands for a hydrogen atom, alkyl with up to 24 carbon atoms (which may carry at least one substituent selected from halogen atoms and nitro, chlorosulfonyl and nitrile groups), aryl (which may carry at least one substituent selected from halogen atoms, alkyl groups with up to three carbon atoms, and methoxy, ethoxy and nitro groups), a heterocyclic radical (which may carry at least one substituent selected from halogen atoms and lower alkyl groups), alkoxy, nitro, chlorosulfonyl, alkylsulfoxyl, alkylsulfonyl, alkylcarbamidyl, arylcarbamidyl, carbalkoxy, acyl or amidine, some of which are known, which possess fungicidal properties and which may be produced by conventional methods.

8 Claims, No Drawings

SUBSTITUTED HALO PYRAZOLINONES FUNGICIDAL AGENTS

The present invention relates to and has for its objects the provision of fungicidal compositions of certain halopyrazolinones of the formula

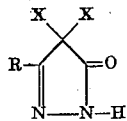

(I)

in which
each X individually stands for a halogen atom, and R stands for a hydrogen atom, alkyl with up to 24 carbon atoms (which may carry at least one substituent selected from halogen atoms and nitro, chlorosulfonyl and nitrile groups), aryl (which may carry at least one substituent selected from halogen atoms, alkyl groups with up to three carbon atoms, and methoxy, ethoxy and nitro groups), a heterocyclic radical (which may carry at least one substituent selected from halogen atoms and lower alkyl groups), alkoxy, nitro, chlorosulfonyl, alkylsulfoxyl, alkylsulfonyl, alkylcarbamidyl, arylcarbamidyl, carbalkoxy, acyl or amidine, some of which are known and which possess fungicidal properties, in the form of mixtures of such compounds with solid and liquid dispersible carrier vehicles, preferably containing a surface-active agent, and methods for using such compounds in a new way especially for combating fungi, with other and further objects becoming apparent from a study of the within specification and accompanying examples.

It is known that fungal plant diseases can be combated by application of chemicals with fungitoxic effectiveness. The most-used agents include the commercial preparations N-trichloromethylthiotetrahydrophthalimide (E) (see A. R. Kittleson: Science 115,84 (1952), zinc ethylene-1,2-bisdithiocarbamate (B) (see F. W. Heuberger, T. F. Manns: Phytopathology 33, 133 (1943)), tetramethylthiouram disulfide (D) (see German Pat. Specification No. 642,532 and U.S. Pat. No. 1,972,961), pentachloronitrobenzene (A) (see German Pat. No. 529,665) and zinc dimethyldithiocarbamate (C). These fungicides have a broad activity spectrum but, despite this, they are ineffective, or only slightly effective, against numerous phytopathogenic fungi. These shortcomings, of course restrict their practical usefulness.

The present invention provides a fungicidal composition containing as active ingredient a halopyrazolinone of the formula (I) as defined above, in admixture with a solid diluent or carrier or in admixture with a liquid diluent or carrier containing a surface-active agent.

Surprisingly, the halopyrazolinones which can be used according to the invention possess, like the fungicides of the prior art, a broad fungitoxic activity spectrum and, in addition, in many cases they exhibit, at the same application concentration, a substantially higher degree of fungitoxic activity than the prior art fungicides. They are therefore superior, on the whole, to the agents known from the prior art; this is especially so in the case of the application of the agents according to the invention for seed treatment and soil treatment. In the concentrations normally used for the control of phytopathogenic fungi they do not damage cultivated plants. They possess only a slight toxicity to warm-blooded animals and because they have only a slight odor and are non-irritating to human skin, are consequently easy to handle. They are therefore suitable for practical use as crop protection agents and therefore represent an enrichment of the art.

The halopyrazolinones which can be used according to the in invention, which may also be present in the tautomeric enol form, are defined by the general formula (I). In this formula, each X stands preferably for a fluorine, chlorine or bromine atom, and R stands preferably for a hydrogen atom, alkyl with up to 17 carbon atoms, trichloromethyl, phenyl, methoxy phenyl or nitrophenyl.

As examples of the compounds which can be used according to the invention, there may be mentioned:
3-methyl-4,4-difluoropyrazolinone-(5)
3-methyl-4,4-dibromopyrazolinone-(5)
3-methyl-4,4-dichloropyrazolinone-(5)
3-ethyl-4,4-dichloropyrazolinone-(5)
3-ethyl-4,4-dibromopyrazolinone-(5)
3-n-propyl-4,4-dichloropyrazolinone-(5)
3-n-propyl-4,4-dibromopyrazolinone-(5)
3-tert.-butyl-4,4-dichloropyrazolinone-(5)
3-tert.-butyl-4,4-dibromopyrazolinone-(5)
3-phenyl-4,4-dichloropyrazolinone-(5)
3-phenyl-4,4-dibromopyrazolinone-(5)
3-m-nitrophenyl-4,4-dichloropyrazolinone-(5)
3-m-nitrophenyl-4,4-dibromopyrazolinone-(5)
3-p-methoxyphenyl-4,4-dichloropyrazolinone-(5)
3-p-methoxyphenyl-4,4-dibromopyrazolinone-(5)
4,4-dichloropyrazolinone-(5)
3-trichloromethyl-4,4-dichloropyrazolinone-(5)
3-heptadecane-4,4-dichloropyrazolinone-(5).

Some of the compounds which can be used according to the invention are already known. (See Journal of the American Chemical Society, Volume 80, pages 599–601 and 5796–5798 (1958) and Journal of Organic Chemistry, Volume 31, pages 2867–2873 (1966)).

Some of the compounds which can be used according to the invention are new, but they can be prepared in a simple manner according to the processes which are known in principle. They are obtained, for example, when either pyrazolidinones or pyrazolinones are reacted with elemental halogen at temperatures between 0° and 150° C in the presence of inert solvents such as carbon tetrachloride, chloroform, methylene chloride and other halogenated alkanes, as well as halogenated aromatic compounds, such as chlorobenzene and the dichlorobenzenes. The reaction products may be isolated by distilling off the low-boiling solvent, when such is used, or by using just so much of a high-boiling solvent that the reaction products, which frequently are obtained in a good crystalline form, can be suction filtered directly.

The active compounds according to the invention exhibit a strong fungitoxic activity and can be used as crop protection agents, especially for soil treatment, for seed treatment and for the treatment of above-thesoil parts of plants. They are especially effective against *Corticium rolfsii, Sclerotinia sclerotiorum, Verticillium alboatrum, Thielaviopsis basicola, Phytophthora cactorum, Fusarium culmorum, Fusarium oxysporum, Fusarium solani* f. pisi, *Pythium ultimum, Tilletia caries* and bacteria.

The active compounds according to the instant invention can be utilized, if desired, in the form of the usual formulations or compositions with conventional inert (i.e., plant compatible or herbicidally inert) pesticide diluents or extenders, i.e., diluents or extenders of the type usable in conventional pesticide formulations or compositions, e.g., conventional pesticide dispersible carrier vehicles, such as solutions, emulsions, suspensions, emulsifiable concentrates, spray powders, pastes, soluble powders, dusting agents, granules, etc. These are prepared in known manner, for instance, by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides and acaricides, or insecticides, herbicides, bactericides, nematocides, protective substances preventing damage by birds, growth substances, plant nutrients and soil structure improvement agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.001–5 percent, preferably 0.05–1 percent, by weight of the mixture. Thus, the present invention contemplates over-all compositions which comprise mixture of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.001–95 percent, and preferably 0.05–95 percent, by weight of the mixture.

In the case of seed treatment, there are required, in general, amounts of active compound of 0.01 to 50 g., preferably 0.5 to 5 g., per kilogram of seed.

For soil treatment, amounts of active compound of 1 to 1000 g., preferably from 10 to 200 g., per cubic meter of soil are generally used.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g., about 20–100 percent by weight of the active compound.

Furthermore, the present invention contemplates methods of selectively killing, combating or controlling fungi, and more particularly methods of combating fungi, which comprise applying to (a) such fungi and (b) the corresponding habitat thereof, i.e., the locus to be protected, a correspondingly combative or toxic amount, i.e., a fungicidally effective amount, of the particular active compound of the invention alone or together with a carrier vehicle as noted above. The instant formulations or compositions are applied in the usual manner, for instance by spraying, squirting, atomizing, vaporizing, scattering, dusting, watering, sprinkling, pouring, via dry dressing, moist dressing, wet dressing, paste dressing, incrustations, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding fungicidal activity of such active compounds usable according to the present invention is illustrated, without limitation, by the following examples.

EXAMPLE 1

Agar Plate Test

Test for fungitoxic effectiveness and breadth of the activity spectrum.
Solvent: acetone
Parts by weight:
(a) 1000
(b) 100

To produce a suitable preparation of the active compound, 1 part by weight of the active compound is taken up in the stated amount of solvent.

The preparation of the active compound is added to potato dextrose agar (which has been liquefied by heating) in such an amount that the desired concentration of active compound is set up therein. After through shaking to achieve a uniform dispersion of the active compound, the agar is poured into Petri dishes under sterile conditions. When the mixture of substrate and active compound has solidified, test fungi from pure cultures are inoculated on to it in small discs of 5 mm diameter. The Petri dishes remain at 20° C for 3 days for incubation.

After this time, the inhibiting action of the active compound on the mycelium growth is determined in categories, taking into account the untreated control. 0 means no mycelium growth, either on the treated substrate or on the inoculum, the symbol — means mycelium growth on the inoculum only, no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table 1:

EXAMPLE 2

Seed Dressing Test/Bunt of Wheat (Seed-borne Mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g. of the chlamydospores of *Tilletia caries* per kg of seed. To apply the dressing, the seed is shaken with the dressing in a closed glass flask. The seed, on moist loam under a cover of a layer of muslin and 2 cm of moderately moist compost soil, is exposed to optimum germination conditions for the spores for 10 days at 10° C in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 2:

TABLE 2

Seed Dressing test/bunt of wheat

| Active compounds | Concentration of active compound in the dressing in % by weight | Amount of dressing applied in g/kg seed | Spore germination in % |
|---|---|---|---|
| non-dressed | – | – | >10 |
| Zinc ethylene-bis-dithiocarbamate | 10 | 1 | 5 |
| | 10 | 1 | 0.05 |
| | 30 | 1 | 0.005 |
| | 30 | 1 | 0.000 |
| | 10 | 1 | 0.05 |
| | 30 | 1 | 0.005 |

TABLE 1

Agar plate test

| Active compound | Concentration of active compound in substrate in p.p.m. | *Corticium rolfsii* | *Sclerotinia sclerotiorum* | *Verticillium alboatrum* | *Thielaviopsis basicola* | *Phytophthora cactorum* | *Fusarium culmorum* | *Fusarium oxysporum* | *Fusarium solani f. pisi* |
|---|---|---|---|---|---|---|---|---|---|
| Untreated | | + | + | + | + | + | + | + | + |
| Pentachloronitrobenzene (known) (A) | (a) 10 | | + | + | + | + | + | + | + |
| | (b) 100 | 0 | + | + | + | | + | + | + |
| Zinc ethylene-bis-dithiocarbamate (known) (B) | (a) 10 | + | + | + | + | | + | + | + |
| | (b) 100 | + | + | + | 0 | | + | + | + |
| Zinc dimethyldithiocarbamate (known) (C) | (a) 10 | + | + | + | + | | + | + | + |
| | (b) 100 | + | 0 | + | + | | + | + | + |
| 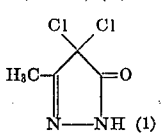 (1) | (b) 100 | 0 | 0 | 0 | 0 | 0 | 0 | 0 | 0 |
| 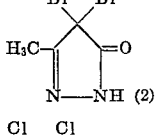 (2) | (a) 10 | 0 | 0 | 0 | 0 | 0 | 0 | 0 | 0 |
| | (b) 100 | 0 | 0 | 0 | 0 | 0 | 0 | 0 | 0 |
| 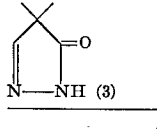 (3) | (b) 100 | 0 | 0 | 0 | 0 | 0 | 0 | 0 | + |

EXAMPLE 3

Soil Treating Agent Test/Soil-borne Mycoses

To produce a suitable preparation of the active compound, the active compound is extended with talc to a content of 5 percent and subsequently with quartz sand to a content of 0.5 percent of active compound.

The preparation of the active compound is uniformly mixed with Fruhstorfer standard soil, which has first been sterilized and then inoculated with pure cultures of the test fungi.

The soil is filled into 5 pots, each of which is sown with 10 seeds of the host plants. The pots are placed in a greenhouse at the stated temperatures and kept normally moist.

3 weeks after sowing, the number of healthy plants is determined as a percentage of the number of seeds sown. 0 percent means that no healthy plants have grown; 100 percent means that healthy plants have resulted from all the seeds.

The active compounds, the concentrations of the active compounds in the soil, the test fungi, host plants, greenhouse temperatures and the results obtained can be seen from the following Table 3:

EXAMPLE 4

Soil Treating Agent Test/Pythium Ultimum

To produce a suitable preparation of the active compound, the active compound is extended with talc to a content of 5 percent and subsequently with quartz sand to a content of 0.5 percent of active compound.

The preparation of the active compound is uniformly mixed with naturally infected compost soil which, when sown with wrinkled canning peas, is known from experience to lead to high losses among the seedlings through *Pythium ultimum*. The soil is filled into 5 pots, each of which is sown with 10 seeds of the wrinkled canning pea. The pots are placed in a greenhouse at 15°–18 and kept normally moist.

Three weeks after sowing, the number of healthy plants is determined as a percentage of the number of seeds sown. 0 percent means that no healthy plant has grown; 100 percent means that healthy plants have resulted from all the seeds.

The active compounds, the concentrations of the active compounds in the soil, and the results obtained can be seen from the following Table 4.

TABLE 4

Soil treating agent test/Pythium ultimum

| Active compounds | Concentration of active compound in mg/liter soil | Number of healthy plants in % |
| --- | --- | --- |
| untreated | – | 2 |
| Tetramethylthiouram-disulfide (known) (D) | 10 | 4 |
|  | 25 | 8 |
|  | 50 | 24 |
|  | 100 | 62 |
| Zinc ethylene-bis-dithiocarbamate (Known) (B) | 10 | 6 |
|  | 25 | 2 |
|  | 50 | 6 |
|  | 100 | 16 |
| (1) | 25 | 78 |
|  | 50 | 90 |
|  | 100 | 92 |
|  | 200 | 94 |
| (3) | 100 | 72 |

TABLE 3
Seed treating agent test /soil-borne mycoses

| Active compounds | Concentration of active compound in mg./liter soil | Number of healthy plants in percent | | | |
| --- | --- | --- | --- | --- | --- |
| | | Test fungi | | | |
| | | *Fusarium culmorum* | *Verticill. alboatrum* | *Corticium rolfsii* | *Thielaviopsis basicola* |
| | | Host plant | | | |
| | | Pea | Pea | Pea | Cotton |
| | | Temperature range | | | |
| | | 22–25° | 22–25° | 22–25° | 22–2525° |
| Fruhstorfer standard soil, sterilized, untreated | | 92 | 96 | 96 | 96 |
| Fruhstorfer standard siil, sterilized and inoculated, untreated | | 6 | 6 | 0 | 0 |
| Tetramethylthiouram disulfide (known) (D) | 10 | 8 | 20 | | |
| | 25 | | 22 | 2 | 2 |
| | 50 | 16 | 18 | 22 | 6 |
| | 100 | 42 | 22 | 30 | 6 |
| | 200 | | | 34 | |
| 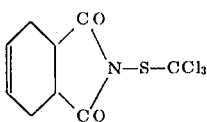 (known) (E) | 10 | 10 | 30 | 6 | 22 |
| | 25 | 14 | 20 | 22 | 32 |
| | 50 | 14 | 28 | 20 | 50 |
| | 100 | 34 | 38 | 40 | 46 |
| | 200 | | | 46 | |
| Zinc ethylene-bis-dithiocarbamate (known) (B)  | 10 | | | 4 | 0 |
| | 25 | 2 | 8 | 0 | 0 |
| | 50 | 6 | 6 | 0 | 0 |
| | 100 | 2 | 24 | 4 | 0 |
| | 200 | | | 4 | |
| 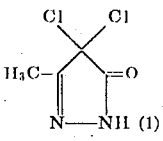 | 10 | | | | 22 |
| | 25 | 74 | 62 | | 52 |
| | 50 | 76 | 76 | 84 | 72 |
| | 100 | 72 | 68 | | 94 |
| | 200 | | 82 | | 98 |

EXAMPLE 5

Seed Dressing Test/Soil-borne Mycoses

To produce a suitable dry dressing, the active compound is extended with a mixture of equal parts by weight of talc and kieselguhr to give a finely powdered mixture with the desired concentration of active compound.

To apply the dressing, the seeds of suitable host plants are shaken with the dry dressing in a closed glass flask. Five batches of 10 grains of the seed are sown in pots which contain Fruhstorfer standard soil which has first been sterilized and then inoculated with pure cultures of the test fungi. The pots are placed in a greenhouse at the hereinafter-stated temperatures and are kept normally moist.

Three weeks after sowing, the number of healthy plants is determined as a percentage of the number of seeds sown. 0 percent means that no healthy plants have grown, whereas 100 percent means that healthy plants have resulted from all the seeds.

The active compounds, their concentrations in the dressing, the amounts of dressing used, test fungi, type of soil, host plants, greenhouse temperatures and the results obtained can be seen from the following Table 5.

TABLE 5

Seed dressing test/soil-borne mycoses

| Active compounds | Concentration of active compound in the dressing in percent by weight | Dressing/seed, g./kg. | Fusarium culmorum Pea 22-25° Number of healthy plants in percent |
|---|---|---|---|
| Fruhstorfer standard soil, sterilized, non-dressed | | | 92 |
| Fruhstorfer standard soil, sterilized and inoculated, non-dressed | | | 22 |
| Tetramethylthiouram disulfide (known) (D) | 50 | 2 | 43 |
| [phthalimide-S-CCl₃ structure] (known) (E) | 5 / 25 / 50 / 75 | 2 / 2 / 2 / 2 | 12 / 38 / 14 / 32 |
| Zinc ethylene-bis-dithiocarbamate (known) (B) | 70 | 2 | 24 |
| [3-methyl-4,4-dichloropyrazolinone structure] (1) | 10 / 30 / 30 | 2 / 2 / 4 | 68 / 78 / 78 |

The following Example illustrates, without limitation, the preparation of the compounds used according to the present invention.

EXAMPLE 6

[Structure of 3-methyl-4,4-dichloropyrazolinone-(5)] (1)

370 g 3-methylpyrazolinone-(5) are suspended in 1.5 liters of methylene chloride in a three-necked flask which is equipped with an introduction tube, a reflux condenser and a thermometer, and 540 g chlorine are introduced, with stirring and cooling. The methylene chloride is distilled off and the residue is recrystallized from white spirit. 594 g 3-methyl-4,4-dichloropyrazolinone-(5) with a melting point of 113° C are obtained. The yield is 94.8 percent of the theory.

In analogous manner, the following active compounds mentioned in the test Examples can be obtained:

| Formula | | m.p. (°C) |
|---|---|---|
| [Cl,Cl pyrazolinone structure] | (3) | 83-85 |
| [Br,Br methyl pyrazolinone structure] | (2) | 130-131 |

It will be appreciated that the instant specification and examples are set forth by way of illustration and not limitation, and that various modifications and changes may be made without departing from the spirit and scope of the present invention.

What is claimed is:

1. A fungicidal composition containing as the active ingredient a fungicidally effective amount of a halopyrazolinone of the formula

[Structure of formula (I)]

in which
each X individually is halogen, and
R is hydrogen, alkyl with up to 24 carbon atoms optionally carrying up to three halo substituents or phenyl optionally carrying a substituent selected from the group consisting of methoxy and nitro,
in admixture with an inert solid pesticide diluent or extender.

2. The composition of claim 1 wherein each X individually is fluorine, chlorine or bromine and R is hydrogen, alkyl with up to 17 carbon atoms, trichloromethyl, phenyl, methoxy-phenyl or nitrophenyl.

3. The composition of claim 1, wherein the active ingredient is 3-methyl-4,4-dichloro-pyrazolinone-(5) of the formula

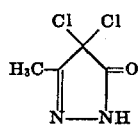  (1)

4. The composition of claim 1, wherein the active ingredient is 3-methyl-4,4-dibromo-pyrazolinone-(5) of the formula

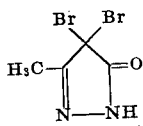  (2)

5. The composition of claim 1, wherein the active ingredient is 4,4-dichloropyrazolinone-(5) of the formula

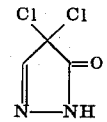  (3)

6. The composition of claim 1 containing from 1 to 95 percent of the active compound, by weight.

7. A method of combating fungi which comprises applying to the fungi or a fungus habitat a fungicidally effective amount of halopyrazolinone of the

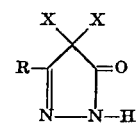  (I)

in which
each X individually is halogen, and
R is hydrogen, alkyl with up to 24 atoms optionally carrying up to three halo substituents or phenyl optionally carrying a substituent selected from the group consisting of methoxy and nitro.

8. The method of claim 7 wherein said halopyrazolinone is
3-methyl-4,4-dichloropyrazolinone-(5),
3-methyl-4,4-dibromopyrazolinone-(5) or
4,4-dichloropyrazolinone-(5).

* * * * *

UNITED STATES PATENT OFFICE
CERTIFICATE OF CORRECTION

Patent No. 3,686,410   Dated August 22, 1972

Inventor(s) Kurt Findeisen et al

It is certified that error appears in the above-identified patent and that said Letters Patent are hereby corrected as shown below:

Col. 6, Table 2

Rewrite last 5 lines of Table under heading "Active Compounds" which were omitted:

"   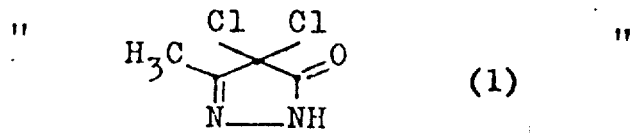   (1)   "

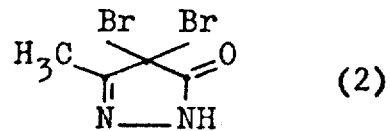   (2)

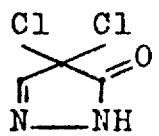

(3)

UNITED STATES PATENT OFFICE
CERTIFICATE OF CORRECTION

Patent No. 3,686,410     Dated August 22, 1972

Inventor(s) Kurt Findeisen et al

It is certified that error appears in the above-identified patent and that said Letters Patent are hereby corrected as shown below:

<u>Col. 7, Table 3,</u>

Second entry under "Active Compounds"

"siil" should be -- soil --

<u>Col. 8, line 4</u>

"15°-18" should be -- 15-18° --

<u>Col. 8, line 32 in Table 4</u>

"200" should be under "100"

Signed and sealed this 23rd day of January 1973.

(SEAL)
Attest:

EDWARD M. FLETCHER, JR.
Attesting Officer

ROBERT GOTTSCHALK
Commissioner of Patents